United States Patent [19]

Uetsuki et al.

[11] Patent Number: 4,779,814

[45] Date of Patent: Oct. 25, 1988

[54] BACKLASH PREVENTION DEVICE FOR FISHING REEL

[75] Inventors: Haruo Uetsuki; Kounoshin Makino, both of Hiroshima, Japan

[73] Assignee: Ryobi, Ltd., Japan

[21] Appl. No.: 79,642

[22] Filed: Jul. 30, 1987

[30] Foreign Application Priority Data

Jul. 31, 1986 [JP] Japan .............................. 61-118719[U]
Mar. 4, 1987 [JP] Japan .............................. 62-32445[U]

[51] Int. Cl.⁴ .................................................. A01K 89/02
[52] U.S. Cl. .................................................. 242/84.52 B
[58] Field of Search ............... 242/84.1 A, 84.52 B, 242/84.52 C, 84.52 R; 254/276; 188/267, 159, 161, 164

[56] References Cited

U.S. PATENT DOCUMENTS

| | | | |
|---|---|---|---|
| 2,361,239 | 10/1944 | Ransom | 242/84.52 B |
| 2,465,932 | 10/1943 | Romine | 310/93 |
| 4,402,470 | 9/1983 | Hamayasu | 242/84.52 R |
| 4,434,951 | 3/1984 | Nakajima | 242/84.52 B |
| 4,549,703 | 10/1985 | Atobe | 242/84.52 B |
| 4,586,674 | 5/1986 | Nakajima | 242/84.52 B |
| 4,601,438 | 7/1986 | Young | 242/84.52 C |
| 4,674,699 | 6/1987 | Fukushima | 242/84.52 B |
| 4,710,689 | 12/1987 | Uetsuki et al. | 318/630 |
| 4,722,492 | 12/1988 | Uetsuki et al. | 242/84.52 B |

FOREIGN PATENT DOCUMENTS

| | | | |
|---|---|---|---|
| 57-31175 | 2/1982 | Japan . | |
| 100570 | 7/1983 | Japan | 242/84.52 B |
| 137077 | 9/1983 | Japan | 242/84.52 B |
| 59-178070 | 11/1984 | Japan | 242/84.52 B |
| 62-1575 | 1/1987 | Japan | 242/84.52 B |
| 635116 | 3/1948 | United Kingdom . | |

Primary Examiner—Stuart S. Levy
Assistant Examiner—Joseph J. Hail, III
Attorney, Agent, or Firm—Finnegan, Henderson, Farabow, Garrett and Dunner

[57] ABSTRACT

A backlash prevention device for a fishing reel where the spool is connected to a nonmagnetic electroconductive member associated with brake magnets that generate eddy currents in the nonmagnetic electroconductive member to provide a braking force on the spool. The backlash prevention device includes moveable magnets for varying the braking force. Magnets on the yoke carrying the moveable magnets are detected to determine when the brake magnets are aligned in either the maximum or minimum braking position.

5 Claims, 5 Drawing Sheets

BACKLASH PREVENTION DEVICE FOR FISHING REEL

BACKGROUND OF THE INVENTION

The present invention relates to a backlash prevention device for a fishing reel, in which a braking force is applied to the spool by electromagnetic induction.

In a conventional backlash prevention device for preventing backlash from being caused by the excessive rotation of the spool at the time of casting, such as identified in Japanese Patent Publication No. 57-31175, a magnetic member is provided at one or both sides of a nonmagnetic electroconductive member which is rotated together with the spool, so that an eddy current is generated in the nonmagnetic electroconductive member to brake the rotation of the spool. Normaly, the magnetic member cannot be adjusted during casting so the spool is braked from before the start of the casting. For that reason, there is a problem that the lure or bait being cast cannot be cast far enough.

Another conventional backlash prevention device disclosed in the unexamined Japanese Utility Model Application No. 8070/84 proposed to solve the above-mentioned problem. In that device, the rotation of the spool was automatically braked when a predetermined time has elapsed from the start of the rotation of the spool. It is, however, very difficult to determine the exact time it takes for the lure or bait being cast to land on the water after the start of the rotation of the spool. In addition, since the distance (and hence the elapsed time) of the cast differs from occasion to occasion, the rotation of the spool is not stopped if the lure or bait lands in the water due to a short cast before the lapse of the predetermined time or the like so that backlash is caused.

Therefore, it is an object of the present invention to provide a spool brake for a fishing reel that does not apply a premature braking force to the spool.

It is an additional object of the invention to provide a fishing reel having a spool brake that does not apply the braking force a predetermined time after the initiation of the cast.

It is an object of the present invention to provide an easily manufactured, compact, lightweight fishing reel having a spool brake that is responsive to the speed of rotation of the spool.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, there is provided a backlash prevention device for a fishing reel having a spool connected to a nonmagnetic electroconductive member. Eddy currents generated in the nonmagnetic electroconductive member exert a braking force on the spool. The backlash preventing device further includes a first set of permanent magnets mounted on the reel body on a first side of the nonmagnetic electroconductive member. A moveable yoke is rotatively mounted on the reel body on a second side of the nonmagnetic electroconductive member. A second set of permanent magnets are mounted on the yoke. The first and second sets of magnets and the nonmagnetic electroconductive member comprise a variable eddy current brake having a braking force variable between a maximum and a minimum value. At least two yoke limit magnets are mounted on the yoke. Magnetic detecting members are associated with the reel body for detecting the yoke limit magnets with the detecting members being disposed to detect the position of the second set of permanent magnets at the position of the second set of permanent magnets corresponding to the maximum and minimum braking values of the eddy current brake.

Preferably, the device includes a plurality of magnets associated with the nonmagnetic electroconductive member and the control means moves the magnets when the spool rotation signal is greater than the preset value, thereby controlling the braking force on the spool.

DETAILED DESCRIPTION OF THE PREFERRED EMBODIMENTS

The embodiments of the present invention are hereafter described with reference to the attached drawings.

Figure 1:
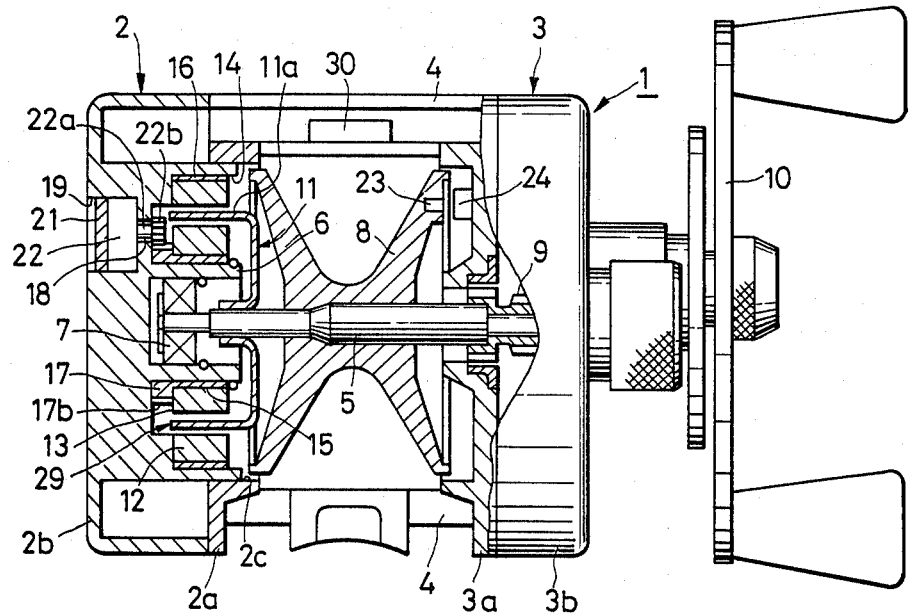
FIG. 1 shows a longitudinal sectional view of an embodiment of the present invention.
Figure 2:
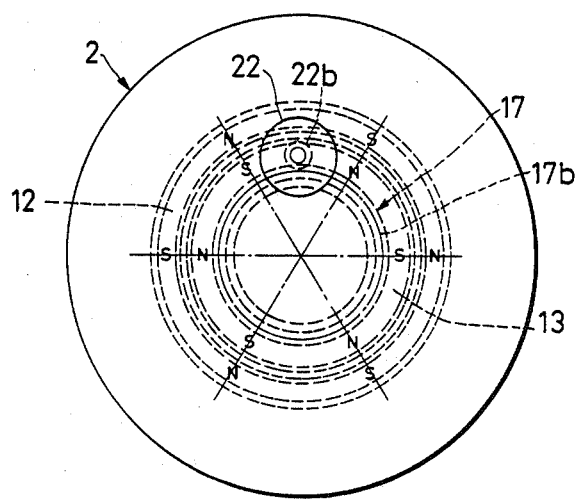
FIG. 2 is a schematic view of the embodiment in the state of maximum braking.

FIGS. 1, 2, 3 and 4 disclose a first embodiment of the invention. FIG. 1 shows a fishing reel in which a spool shaft 5 is supported at both the ends. The body 1 of the fishing reel is made of right and left (in FIG. 1) side frames 2 and 3 coupled to each other by transverse bars 4. The side frames 2 and 3 comprised side plates 2a and 3a and covers 2b and 3b which are secured to the side plates by screws or the like. The spool shaft 5 is supported at both the ends thereof by bearings 7 in the support positions 6 of the covers 2b and 3b so that a spool 8 can be rotated.

A pinion gear 9 is provided near the right (in FIG. 1) end of the spool shaft 5 so that the pinion can be slid on the spool shaft in the axial direction and selectively engaged through a drive gear (not shown) with a handle 10. A clutch mechanism (not shown) is switched to slide the pinion gear 9 on the spool shaft 5 in the axial direction thereof to engage or disengage the pinion from a notched circular portion (not shown) on the end of the spool shaft to connect or disconnect the spool shaft to the pinion gear 9 and hence the handle 10.

A cup-shaped nonmagnetic electroconductive member 11 is secured to the left (in FIG. 1) portion of the spool shaft 5. The peripheral portion 11a of the member 11 extends into the cover 2b from the opening 2c of the side plate 2a. Annular magnets 12 and 13 are provided on annular yokes 15 and 16 inside and outside the peripheral portion 11a of the member 11, respectively, and are located in the annular recess 14 of the cover 2b. At least one (the inner annular magnet 13 in this embodiment) of the annular magnets 12 and 13 can be turned together with an attachment 17 provided on the annular yoke 15.

A gear 17b is formed in the peripheral portion of the attachment 17 and is engaged with a gear 22b provided on a motor shaft 22a, to turn the annular yoke 15. The annular yoke 15 and hence the magnet 13 may be turned through the action of an adjusting cam 20 shown in FIGS. 5 and 6.

A magnet 23 is secured in one side of the rim of the spool 8. A magnetic sensor 24 for detecting the rotation of the spool 8 is secured to the side plate 3a facing the orbit of rotation of the magnet 23 and the sensor 24 is electrically connected to the pulse counter 26 of a counter circuit 25 shown in a block diagram in FIG. 3. The pulse counter 26 is electrically connected to a latch circuit 27 and a reference clock circuit 28.

A control means 29 for causing an eddy current in the nonmagnetic electroconductive member 11 comprises the annular magnets 12 and 13 and the annular yokes 15 and 16.

Shown at 30 in FIG. 1 is a central processing unit.

Figure 3:
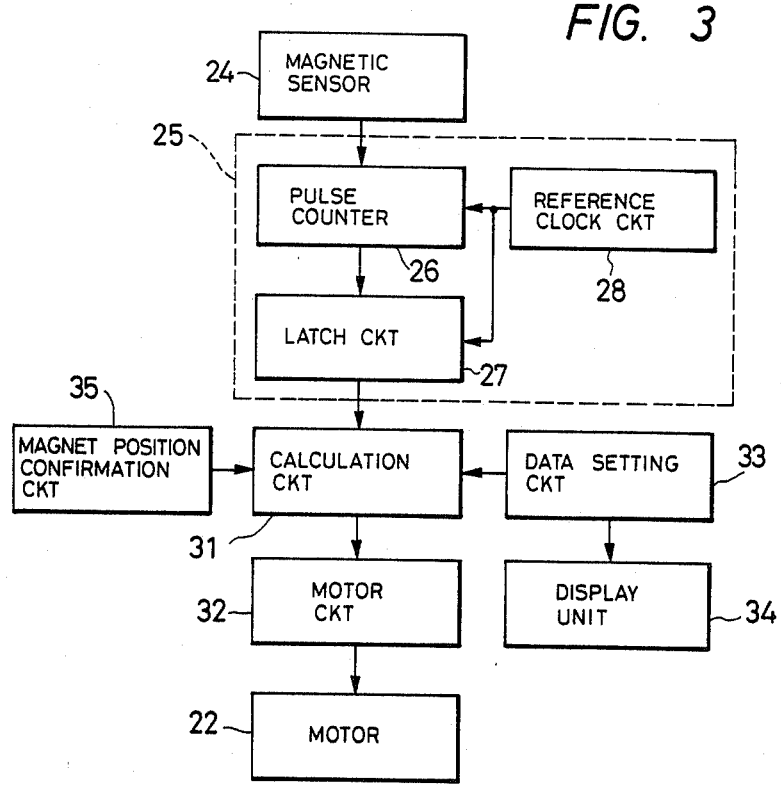
FIG. 3 shows a block diagram of the present embodiment.
Figure 4:
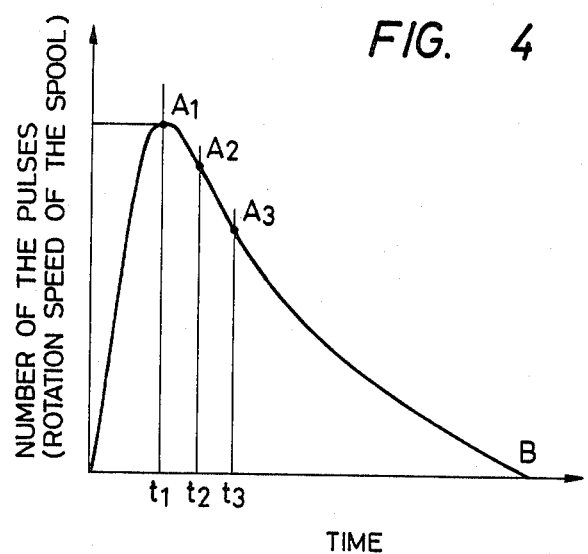
FIG. 4 shows a graph indicating the relation between the speed of rotation of the spool and the time associated with casting.

Shown at 31, 32, 33, 34 and 35 in FIG. 3 are a calculation circuit, a motor circuit, a data setting unit, a display unit and a magnet position confirmation circuit, respectively.

Figure 5:
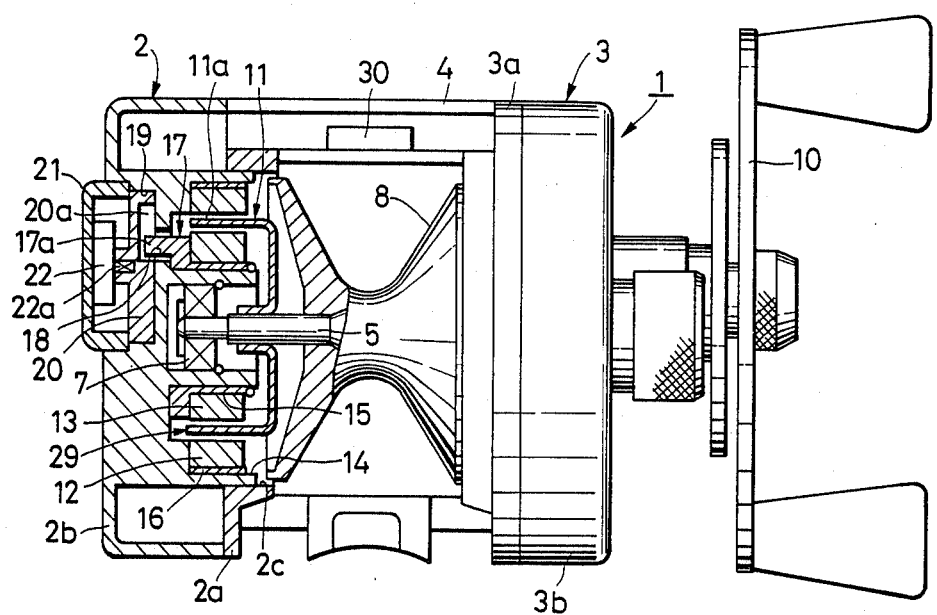
FIG. 5 shows a partial longitudinal sectional view of another embodiment of the present invention.
Figure 6:
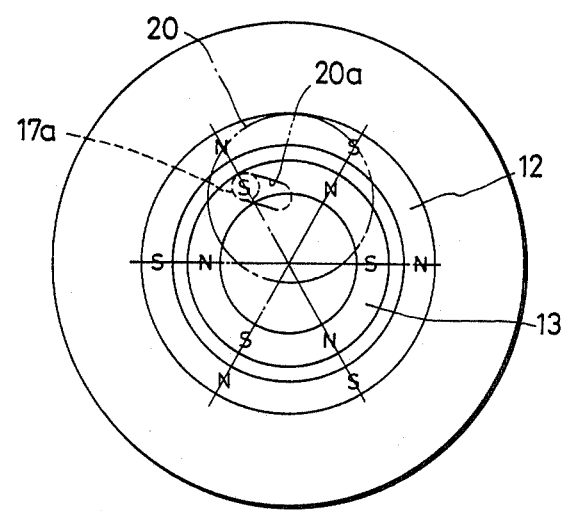
FIG. 6 is a schematic view of the embodiment shown in FIG. 5, in the state of maximum braking.

FIGS. 5 and 6 shows the second embodiment in which a projection 17a extends outward from an attachment 17 and is inserted through the opening 18 of cover 2b so that the projection can be moved within a prescribed range.

The outer side of the cover 2b has a circular recess 19 communicating with the opening 18. A disk-shaped adjusting cam 20 is rotatably supported in the recess 19. The inner side of the adjusting cam 20 has a straight cam groove 20a as shown in FIG. 6. The projection 17a of the attachment 17 is slidably fitted in the cam groove 20a. The cam groove 20a extends from the center of the adjusting cam in the radial direction thereof as shown in FIG. 6, so that the projection 17a is turned by rotating the adjusting cam.

A motor 22 is secured to the inner side of a cover 21 fitted in the outer portion of the recess 19. The center of the adjusting cam 20 is secured to the shaft 22a of the motor 22 to rotate the cam by the motor.

Each of the annular magnets 12 and 13 has north poles and south poles alternately located at prescribed intervals in the circumferential direction thereof.

The nonmagnetic electroconductive member 11 is made of a nonmagnetic substance such as copper and aluminum.

The magnet 23 on the spool 8 (not shown in FIG. 5) is detected by the magnetic sensor 24. The speed or acceleration of the rotation of the spool 8 is calculated by the central processing unit 30 from the output of the magnetic sensor 24 and the counter circuit 25 and compared with a predetermined value in the central processing unit 30. When the difference between the speed or acceleration and the predetermined value has become larger than a preset value, the central processing unit 30 sends a control signal to the motor 22 to drive the motor to rotate the gear 22b of FIG. 1 or the adjusting cam 20 of FIG. 5 to turn the inner annular magnet 13 in such a direction as to increase the eddy current in the nonmagnetic electroconductive member 11. As a result, the spool 8 is decelerated to prevent backlash. When the difference between the speed or acceleration and the predetermined value has thereafter become not larger than the preset value, the motor 22 is driven in reverse to reduce a magnetic force to stop braking the spool 8. Such operations are repeated to prevent backlash.

The data are the ideal rotation speeds $A_1, A_2, A_3, \ldots$ of the spool 8 at prescribed time points $t_1, t_2, t_3, \ldots$ after the start of casting of the lure or bait. A plurality of data can be set for each time point to select one of the plural data for the time point $t_1$, for example, depending on the rotation speed at that time point.

In the counter circuit 25, the number of the pulses from the magnetic sensor 24 is counted by the pulse counter 26 at every signal from the reference clock circuit 28 and then applied to the calculation circuit 31. In other words, the number of pulses is counted by the pulse counter 26 between the signals generated by the reference clock circuit 28 in a prescribed time, so that the counted number of the pulses in the prescribed time is applied from the latch circuit 27 to the calculation circuit 31.

FIGS. 7, 8, 9 and 10 show the third embodiment which is a backlash prevention device for a fishing reel whose spool shaft 109 is supported at both the ends thereof. In the device, annular magnets 115 and 116 are provided on shielding yokes 113 and 114 inside and outside a nonmagnetic electroconductive member 112, which is rotated in conjunction with the rotation of a spool 110. One of the annular magnets 115 and 116 is turned by a motor 118 to regulate an eddy current in the nonmagnetic electroconductive member 112 to brake the rotation of the spool 110. Magnetic sensors 125 and 126 are provided in the face of the peripheral portion of the turnable one of the shielding yokes 113 and 114 so that the magnetic sensors correspond to the maximum and minimum braking positions of the moveable annular magnet. The turnable shielding yoke is provided with slits 123 and 124 for enabling the magnetic sensors 125 and 126 to detect the magnetism of the moveable annular magnet to stop the motor 118.

Figure 7:
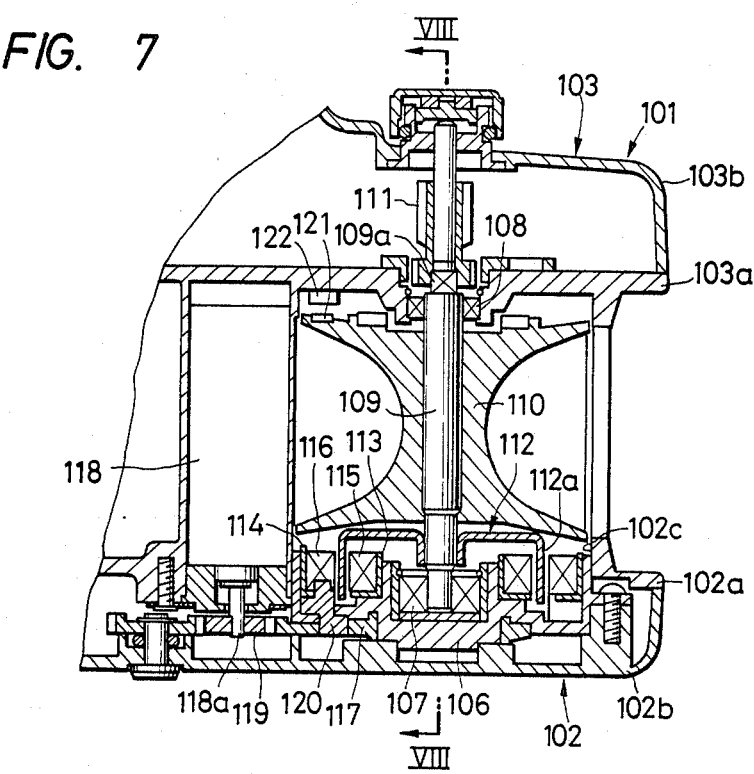
FIG. 7 shows a longitudinal sectional cutaway view of still another embodiment of the present invention.
Figure 8:
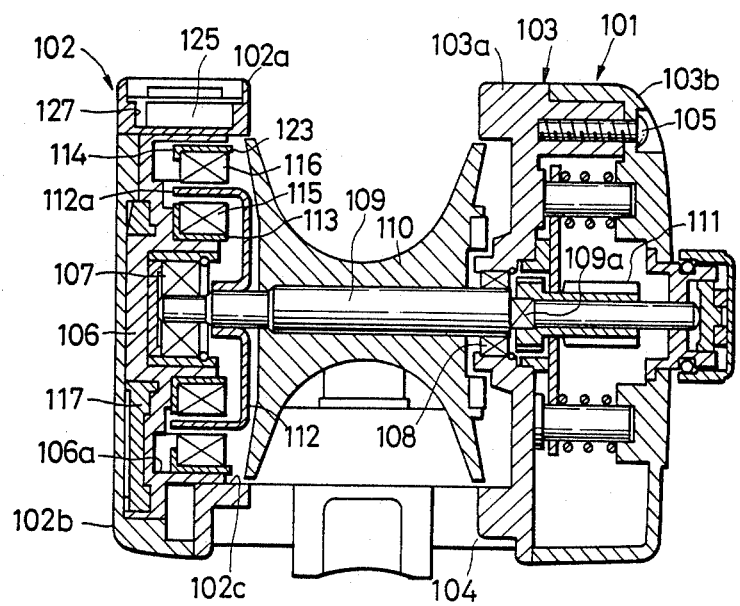
FIG. 8 shows a longitudinal sectional view along the line VIII—VIII shown in FIG. 7.

As shown in FIGS. 7 and 8, the body 101 of the fishing reel is made of a right and a left side frames 102 and 103 coupled to each other by transverse bar 104. The side frames 102 and 103 comprised side plates 102a and 103a covers 102b and 103b secured to the outer sides of the side plates by screws 105 or the like.

The spool shaft 109 is supported by bearings 107 and 108 provided in a magnet holder 106 and the side plate 103a of the side frame 103, so that the spool 110 can be rotated between both the side frames 102 and 103. The magnet holder 106 is secured in the side frame 102.

A pinion 111 is provided near one end of the spool shaft 109 so that the pinion can be slid on the spool shaft in the axial direction thereof and movingly connected to a handle (not shown) through a drive gear (not shown). A clutch mechanism (not shown) is switched to slide the pinion 111 on the spool shaft 109 in the axial direction thereof to engage or disengage the pinion with or from the notched circular portion 109a of the spool shaft to connect or disconnect the spool shaft to or from the pinion 111 and hence the handle.

The cup-shaped nonmagnetic electroconductive member 112 is secured near the other end of the spool shaft 109. The peripheral portion 112a of the member 112 extends into the recess 106a of the magnet holder 106 from the opening 102c of the side plate 102a.

The annular magnets 115 and 116 are provided on the shielding yokes 113 and 114 inside and outside the peripheral portion 112a of the member 112, respectively. In this embodiment, the inner annular magnet 115 is secured, while the outer annular magnet 116 can be turned in the circumferential direction thereof together with the shielding yoke 114.

A magnet gear 117 is rotatably supported by the magnet holder 106 and engaged with a gear 119 provided on the shaft 118a of the motor 118 secured between both the side frames 102 and 103. An attachment 120 for the annular magnet 116 is engaged with the magnet gear 117. As a result, the annular magnet 116 and the shielding yoke 114 are turned together by the motor 118.

A magnet 121 is secured to the rim of the spool 110. A magnetic sensor 122 for detecting the magnet 121 to determine the speed of rotation of the spool 110 is secured to the side plate 103a facing the orbit of rotation of the magnet.

A control means generates eddy current in the nonmagnetic electroconductive member 112 to brake the rotation of the spool 110. Each of the annular magnets 115 and 116 has north poles and south poles alternately located at prescribed intervals in the circumferential direction thereof.

The nonmagnetic electroconductive member 112 is made of a nonmagnetic substance such as copper and aluminum.

Figure 9:
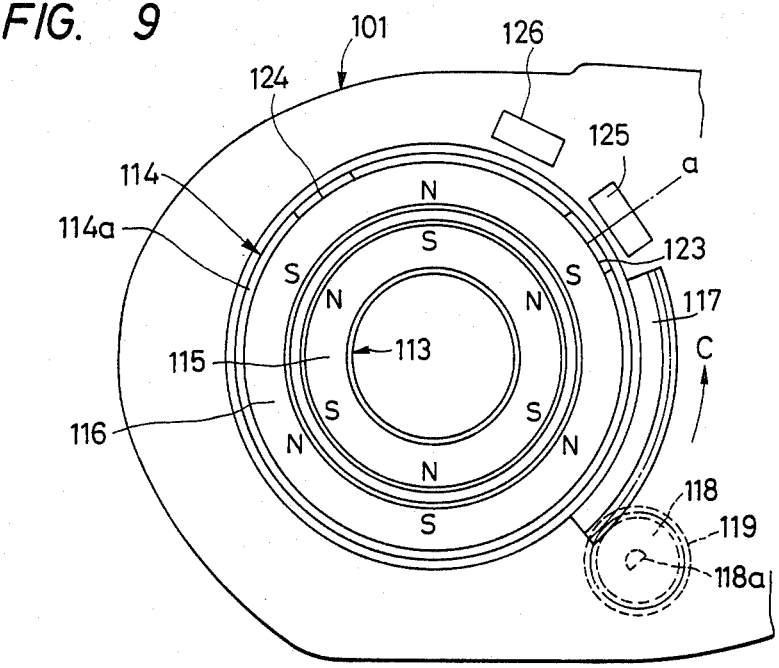
FIG. 9 is a schematic view of the embodiment shown in FIG. 7, in the state of maximum braking.
Figure 10:
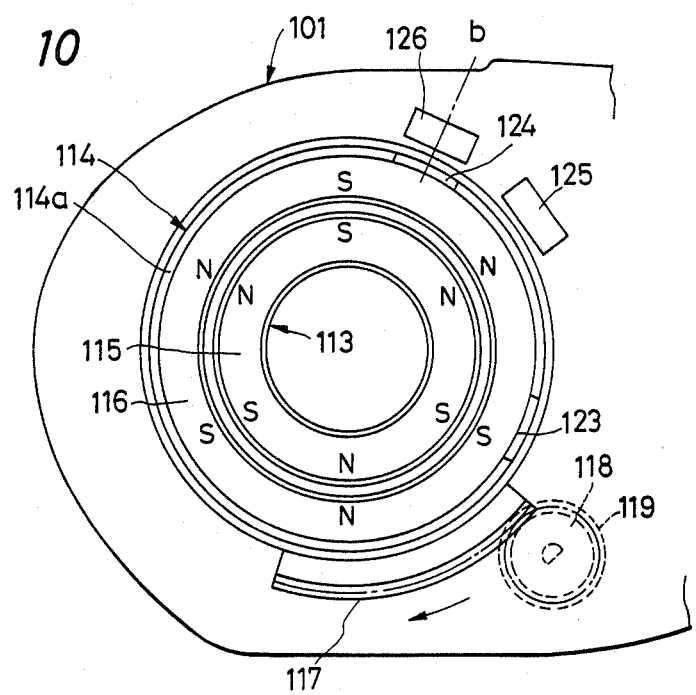
FIG. 10 is a schematic view of the embodiment shown in FIG. 7, in the state of minimum braking.

A mechanism for detecting the rotative limit positions of the annular magnet 116 will now be described. The braking force applied to the spool 110 is maximum when the north and south poles of the annular magnets 115 and 116 are opposed to each other as shown in FIG. 9. The braking force is minimum when the same poles of the annular magnets 115 and 116 are opposed to each other as shown in FIG. 10. The peripheral portion 114a of the shielding yoke 114 is provided with slits 123 and 124 at an appropriate interval in the circumferential direction thereof to detect the annular magnet 116 both in one rotative limit position (a) thereof for the maximum braking force and in the other rotative limit position (b) thereof for the minimum braking force to find out whether the annular magnet is in the rotative limit positions or not. The magnetic sensors 125 and 126 are provided in the recess 127 or the like of the side frame 102 to face the slits 123 and 124 to detect the annular magnet 116 in both the positions (a) and (b) thereof through the slits.

The magnet 121 is detected by the magnetic sensor 122 to determine the rotation of the spool 110. When the rotational frequency of the spool 110 has exceeded a value preset in a circuit not shown in the drawings, the motor 118 is driven to turn the annular magnet 116 and the shielding yoke 114 in such a direction that the braking force shown by an arrow (c) in FIG. 9 is maximized. When the slit 123 faces the magnetic sensor 125, the annular magnet 116 is detected by the magnetic sensor 125 through the slit 123 to stop the motor 118.

When the motor 118 is driven in reverse so that the annular magnet 116 and the yoke 114 are turned in reverse from the position (shown in FIG. 9) for the maximum braking force to the position (shown in FIG. 10) for the minimum braking force and the slit 124 faces the magnetic sensor 126, the magnetism of the annular magnet 116 is detected by the sensor 126 through the slit 124 to stop the motor 118.

Since the rotative limit positions (a) and (b) of the annular magnet 116 for the maximum and the minimum braking forces are detected to control the motor 118 as described above, a mechanism for the control of the motor is simpler than a conventional mechanism employing an electric circuit and so forth. For that reason, the backlash prevention device provided in accordance with the present invention is compact enough to reduce the installation space for the device in the fishing reel to diminish the size and weight of the reel.

What is claimed is:

1. A backlash prevention device for a fishing reel having a reel body supporting a spool connected to a nonmagnetic electroconductive member for applying a braking force on said spool, said device comprising:
    a first set of permanent magnets mounted in said reel body on a first side of said nonmagnetic electroconductive member;
    a moveable yoke rotatively mounted on said reel body on a second side of said nonmagnetic electroconductive member;
    a second set of permanent magnets, including at least two yoke limit magnets, mounted on said yoke;
    said first and second sets of magnets and said nonmagnetic electroconductive member comprising a variable eddy current brake having a braking force variable between a maximum and minimum value; and
    magnetic detecting members associated with said reel body for detecting positions of said second set of permanent magnets corresponding to the maximum and minimum braking values of said eddy current brake.

2. The backlash prevention device of claim 1, wherein said backlash device includes:
    a sensor for determining the speed of rotation of said spool, said sensor providing a speed output signal;
    a timer for generating a constant time output signal;
    a central processing unit for receiving said speed output signal and said constant time output signal, and for generating a spool rotation signal, said central processing unit also containing preset data of spool speed as a function of time;
    control means for comparing said spool rotation signal with said preset data, and for changing an eddy current generated in said nonmagnetic electroconductive member when said spool rotation signal differs from said preset data by an amount greater than a preset value.

3. The backlash prevention device of claim 2, wherein said device includes a plurality of magnets associated with said nonmagnetic electroconductive member and said control means is operative to move said plurality of magnets in response to said spool rotation signal being greater than said preset value to control a braking force on said spool.

4. The backlash prevention device of claim 3, wherein said device includes means for limiting movement of said plurality of magnets to positions that correspond to the maximum applied braking force and the minimum applied braking force.

5. A backlash prevention device for a fishing reel having:
   a rotatably supported spool shaft;
   a spool disposed on the shaft;
   a nonmagnetic electroconductive member disposed on the shaft for rotation in conjunction with rotation on the spool;
   shielding yokes disposed radially inside and outside the nonmagnetic electroconductive member, wherein one of said shielding yokes is turnable;
   annular magnets disposed on the shielding yokes;
   a motor for turning to relative limit positions one of the annular magnets for regulating an eddy current generated in the nonmagnetic electroconductive member for braking the rotation of the spool;
   magnetic sensors disposed proximate a peripheral portion of the turnable one of the shielding yokes, the sensors being positioned corresponding to the rotative limit positions of the turnable annular magnet, the rotative limit positions of the turnable annular magnet being representative of the maximum and minimum levels of the braking force applied to the spool; and
   slits provided in the turnable shielding yoke for enabling the magnetic sensors to detect the magnetism of the turnable annular magnet for determining the rotative limit position of the turnable annular magnets for stopping the motor.

* * * * *